(12) United States Patent
Wu

(10) Patent No.: US 9,928,980 B2
(45) Date of Patent: Mar. 27, 2018

(54) METHOD OF ELECTRICITY LEAKAGE DETECTION AND PREVENTION OF ELECTRICAL EQUIPMENT'S OUTER SURFACE AND SYSTEM THEREOF

(76) Inventor: Wei Wu, Wenzhou (CN)

( * ) Notice: Subject to any disclaimer, the term of this patent is extended or adjusted under 35 U.S.C. 154(b) by 521 days.

(21) Appl. No.: 14/350,089

(22) PCT Filed: Dec. 12, 2011

(86) PCT No.: PCT/CN2011/083810
§ 371 (c)(1),
(2), (4) Date: Apr. 7, 2014

(87) PCT Pub. No.: WO2013/067729
PCT Pub. Date: May 16, 2013

(65) Prior Publication Data
US 2014/0239744 A1 Aug. 28, 2014

(30) Foreign Application Priority Data
Nov. 12, 2011 (CN) .......................... 2011 1 0385096

(51) Int. Cl.
*H01H 47/00* (2006.01)
*H02H 3/14* (2006.01)
*H02H 3/16* (2006.01)

(52) U.S. Cl.
CPC ........ *H01H 47/005* (2013.01); *H01H 47/002* (2013.01); *H02H 3/14* (2013.01); *H02H 3/16* (2013.01); *H02H 3/162* (2013.01)

(58) Field of Classification Search
CPC .................................................... H01H 47/002
(Continued)

(56) References Cited

U.S. PATENT DOCUMENTS

| 4,506,260 A | * | 3/1985 | Woodruff | ............. | H02H 11/001 |
| | | | | | 340/649 |
| 5,606,480 A | * | 2/1997 | Nevo | .................... | G01R 31/026 |
| | | | | | 361/45 |

(Continued)

FOREIGN PATENT DOCUMENTS

| WO | WO 1997/036358 | 10/1997 | |
| WO | WO 9736358 A1 | * 10/1997 | ............... H02H 3/14 |

*Primary Examiner* — Adi Amrany

(57) ABSTRACT

Disclosed in the present invention are a method of electricity leakage detection and prevention of electrical equipment's outer surface and system thereof. The method and system are used for detecting and preventing electricity leakage of the electrical equipment's outer surface caused by defective insulation and power supply connection faults. Without in touch with the electrical equipment's outer surface, the electricity leakage of the outer surface can be detected and the connection between the electrical equipment and the power supply can be cut and an alarm is made by means of the current channel (2) formed between the electrical equipment neutral line (N') and the electrical equipment's outer surface (G') and the monitoring of the current value. A power supply channel (5) is set up to make sure that the electrical equipment can be normally operated via the system even in the condition of the power supply connection faults. According to the method and system, the electricity leakage of the outer surface can be correctly detected and the alarm can be made or the connection between the electrical equipment and the power supply can be cut even if the electrical equipment's outer surface is not grounded. With the advantage of simple construction and low cost, the system can be widely used.

10 Claims, 6 Drawing Sheets

(58) Field of Classification Search
USPC .................. 307/112, 116, 125, 131, 326
See application file for complete search history.

(56) References Cited

U.S. PATENT DOCUMENTS

| | | | | |
|---|---|---|---|---|
| 5,654,857 | A * | 8/1997 | Gershen | H02H 3/33 361/118 |
| 6,023,400 | A * | 2/2000 | Nevo | H02H 3/14 361/115 |
| 6,212,048 | B1 * | 4/2001 | Chaudhry | H02H 9/005 361/117 |
| 7,616,413 | B2 | 10/2009 | Lee | |
| 7,889,464 | B2 * | 2/2011 | Chen | H01H 83/14 361/42 |
| 8,339,270 | B2 * | 12/2012 | Silverman | H02H 11/002 324/500 |
| 2005/0168893 | A1 * | 8/2005 | Silverman | H02H 11/001 361/42 |
| 2006/0119997 | A1 * | 6/2006 | Lee | H02H 3/335 361/42 |
| 2009/0160663 | A1 * | 6/2009 | Silverman | H02H 11/002 340/654 |
| 2010/0073178 | A1 * | 3/2010 | Huang | H01H 83/04 340/664 |
| 2015/0372475 | A1 * | 12/2015 | Wu | H02H 11/002 361/42 |

* cited by examiner

1 CURRENT CHANNEL
2 CURRENT CHANNEL
3 DETECTION CIRCUIT
4 AMPLIFICATTION AND EXECUTION CIRCUIT
5 POWER CHANNEL
R LOAD
G' OUTER SURFACE

METHOD OF ELECTRICITY LEAKAGE DETECTION AND PREVENTION OF ELECTRICAL EQUIPMENT'S OUTER SURFACE AND SYSTEM THEREOF

FIELD OF THE INVENTION

The present invention relates to an electricity leakage detection and prevention method, more particularly, to an electricity leakage detection and prevention method of electrical equipment's outer surface and system thereof.

BACKGROUND OF THE INVENTION

During the use of household equipment, insulation deterioration of equipment or erroneous wiring of power supply may cause the outer surface of equipment energized; if a person contacts the surface then a current will flow though the person's body to the earth and cause the causalities. Connecting a ground wire with the equipment or using a conductor to connect the equipment to the earth directly can pass the leakage current directly to the earth and prevent the causalities. However, in many cases the outer surface of equipment is not well grounded.

Technical Problem

Many methods and apparatuses have been developed to prevent the surface electricity leakage. Chinese national standard GB6829-86 "Residential current-operated protective devices" and International Standard IEC755 (1983) "General requirements for residual current-operated protective devices" defined the regulation for RCD (Residual Current Device) which protects people form electrical shock by detecting residual current. The principle of a RCD is to use the live line (three-phase or single-phase) and the neutral line as the primary winding of a current transformer, in normal situation, the inflow live line current is equal to the outflow neutral line current therefore the residual current is zero and the corresponding secondary output voltage of the transformer is zero too. When the electrical insulation between the live line and equipment surface is defective, resulting at the surface energized, if a person contacts with the surface, the live line current will flow through the person's body to the earth, rather than flow through the neutral line and go back to power supply, so that the transformer's live line current is no longer equal to the neutral line current thus transformer's secondary voltage is generated. This secondary voltage will be amplified by the amplifier circuit, and trip the executive circuit to disconnect the power supply to prevent the causalities. The Chinese Patent ZL200520102796.8 "The dry washer's single processor control device with grounding wire leakage protection" provides another leakage protection solution by monitoring the voltage between equipment surface and neutral line, by a transformer and a voltage comparator, to prevent hazard caused by electricity leakage. However, this method and apparatus connect a transformer between the neutral line and equipment surface, in case of the live line and neutral line are swapped, the live line will energize the equipment surface, if a person happens to touch the equipment surface, the leakage current going through the person's body may be far greater than the safe current, the person may be harmed.

Above-mentioned residual current detection methods and apparatuses require a person touch energized equipment surface to generate a body current that trips the RCD to cut off the power supply. If due to malfunction the RCD failed to cut off the power supply within specified time period (for example, 0.1 second), it may still cause harm to human body. The above-mentioned method and apparatus that works at monitoring the voltage difference between neutral line and equipment surface does not limit the surface leakage current introduced by the measuring circuit loop and can still cause harm to the human body.

The prior art methods and devices focus on the leakage prevention when both the power supply and equipment's neutral and live lines are connected correspondingly, but without considering how to measure and prevent the leakage caused by erroneous wiring. On the other hand, all the prior art devices' amplifier circuit get work power from the power supply, in case the power supply is wired erroneously, even if the leakage can be detected by the device, the device still fail to work because the device need power to operate but the power is lost due to faulty wiring.

Technical Solution

The present invention proposes a method and system which can improve above-mentioned defects, even when the power supply has no grounding available or the equipment's outer surface isn't grounded, no matter the electricity leakage is caused by insulation deterioration of the equipment or by faulty wiring of the power supply. When the power supply's neutral line is connected correctly with the equipment's neutral line, it detects the electricity leakage and removes the power supply to the equipment before a person touches the equipment surface. In case the equipment's neutral line is erroneously connected to power supply's live line, a person's body contacting the equipment surface will generate a preset value current that will trip the invented system cut off the power supply as well. Since the preset current is far less than the safe current for the human body, it will not cause the causalities even in the case of invented system fails to work. Furthermore, the present invention can always get work power from the power supply which itself is the object under test, in various wiring conditions. The principle of the invention is as follow: In normal situation, either single-phase or three-phase power supply, when wired correctly, the power supply's live line L should be connected to equipment's live line L', the power supply's neutral line N should be connected to the equipment's neutral line N', and power supply's ground line should be connected to the equipment surface G'. When the wiring is faulty and the grounding line of the power supply is lost and the outer surface G' is not grounded, the possible faulty wrings are as follow (define power supply live line L, power supply neutral line N, equipment live line L', equipment neutral line N', equipment surface G'):

1. L connects to N' and N connects to L'. In this case G' is not energized and the equipment can work;
2. L connects to L' and N connects to G'. In this case G' is not energized and the equipment is unable to work;
3. L connects to G' and N connects to L'. In this case G' is energized and the equipment is unable to work;
4. L connects to N' and N connects to G'. In this case G' is not energized and the equipment is unable to work;
5. L connects to G' and N connects to N'. In this case G' is energized and the equipment is unable to work.

Among the five possible faulty wirings above, from case 2 to case 5 the equipments are not working. Both case 3 and case 5 result in surface leakage which should be protected against. It is obvious that in cases 2 through 5, either L or N is connected to the equipment surface G', and the other is either connected to N' or connected to L'. That is, if the appropriate current channel is preset, in cases 2 through 5, there can be always a current flowing through the preset current channel reaching equipment surface G'. For example, one can use a current channel 1 connecting N' to L', and use a current channel 2 connecting N' to G'. There will be no current flowing the current channel 2 as long as the power supply to the equipment is wired correctly; in cases 2 through 5, there will be a current flowing through current channel 2, so those cases can be detected by measuring the current flowing through current channel 2, thereby indicating these error conditions by activating an alarm indication or removing the power to the equipment, thus avoiding electrocution. In addition, we connect directly or indirectly the amplification and execution circuit of invent system, through a preset power channel, to equipment surface G' and equipment live line L' or equipment neutral line N', so that in all above-mentioned faulty wiring cases, the leakage protection circuit can always get the power supply, thereby overcoming the deficiencies in the prior art devices.

A method of electricity leakage detection and prevention of electrical equipment's outer surface has been provided by using following technical solutions to achieve above-mentioned purposes:
1. Monitoring the current between equipment's neutral line and equipment surface.
2. If the current between equipment's neutral line and equipment surface is detected larger than the preset threshold, tripping the amplification and execution circuit to alarm or remove the power supply to the equipment.

Said amplification and execution circuit connects to the equipment surface and equipment's live line and/or equipment's neutral line directly or indirectly through preset power channel, to get required work power.

A system of electricity leakage detection and prevention of electrical equipment's surface has been provided to realize above-mentioned purposes and method:

A system of electricity leakage detection and prevention of electrical equipment's surface comprises detection circuit 3 and amplification and execution circuit 4, wherein the system further comprises one or more current channel and one or more power channel.

Said current channel comprises current channel 1 and current channel 2; the current channel 1 includes electronic components which can pass electronic current, and connects the equipment's live line L' and the equipment's neutral line N'; the current channel 2 includes electronic components which can pass electronic current, and connects the equipment's neutral line N' and the equipment's surface line G'. By adjusting the electronic component's parameter in current channel 2 so that when the voltage between the equipment's neutral line N' and the equipment surface G' is equal to the voltage between power supply's live line L and neutral line N, the current in channel 2 is less than a current which is safe to pass a human body.

The detection circuit 3 contains a current transform device, whose input current may contain the current flowing through the current channel 2; also may not only contain the current flowing through the current channel 2, but also the current flowing through equipment' live line L' and the current flowing through equipment's neutral line N'. The detection circuit 3's output terminal connects to the input terminal of the amplification and execution circuit 4.

The amplification circuit 4 may contain one or more amplification and execution circuit unite, which can amplify the electrical signals and cut off power supply to equipment.

Said power channel may contain Three-phase Rectifier Bridge, the three AC input terminal of the rectifier bridge connect to the equipment's live line L', and the equipment's neutral line N' and the equipment surface G', the positive and negative output terminals of the rectifier bridge are connected correspondingly to the positive and negative input of the power supply of amplification and execution circuit 4; it may contain two or more than two diodes, the diodes are connected to each other by the same polarity then further connected to the work power of the amplification and execution circuit unite of amplification and execution circuit 4, one of the remaining diode poles is connected to the equipment surface G', another remaining pole is connected to the equipment live line L'; it may contain two conductors, the first conductor's one end is connected to the equipment surface G', the second conductor's one end is connected to the equipment's neutral line N', the two remaining ends of conductors are connected to two terminals of work power of the amplification and execution circuit unite of the amplification and execution circuit 4; it may contain two or more than two wire windings which are wound to the same electronic relay, one end of the first winding is connected to the equipment's live line L', while another end is connected to the one independent output terminal of the amplification and execution circuit unite, one end of the second winding is connected to the equipment surface G', while another end is connected to another independent output terminal of the amplification and execution circuit unite.

Advantageous Effects

Comparing to the prior art, the advantageous effects of the method and system of the present invention are as following:
1. By presetting current channel and monitoring the current of the preset current channel, it is possible to discover the equipment surface leakage before a person contacts with the equipment surface, and then trip the alarm induction and cut off power supply to the equipment, eliminating potential accidents.
2. By setting the power channel, the invented protection system can get work power even at faulty wiring conditions so that can handle the equipment surface electricity leakage caused by faulty wiring.
3. By presetting the threshold of current between equipment neutral line and equipment surface, even in case of the system failure and the power supply live line is connected erroneously to equipment's neutral line, and a person happens contacting with the equipment surface, the current flowing through the person's body will be less than the safe current allowed to pass human body, the person will not be harmed.
4. In case the equipment is floating, which is the equipment surface is neither grounded nor connected to the power supply's grounding line, it is still able to detect the electrical leakage of equipment surface and trip the alarm indication or remove the power supply to equipment.
5. The leakage prevention and protection system of present invention is simple, reliable and low-cost, can be widely applied.

Figure 1:
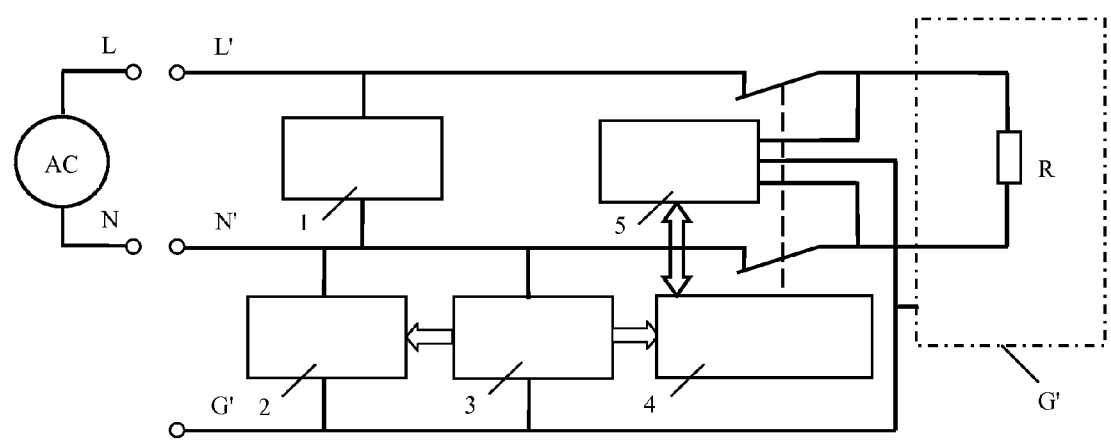
FIG. 1 is a schematic view of the present invention method.

Where in above figures: current channel 1, current channel 2, detection channel 3, amplification and execution channel 4, and current channel 5.

BEST MODE EMBODIMENTS OF PRESENT INVENTION

Combining the above mentioned figures, we give the detailed description of present invention below:

FIG. 1 illustrates present invention method's operating conditions and steps. Illustrated at FIG. 1, the operating conditions of present invention comprising:
1. The current channel 1 connects equipment's live line L' and neutral line N', and the current channel 2 connects equipment's neutral line N' and the surface G'.
2. Through power channel 5 the amplification and execution circuit 4 is connected directly or indirectly to the equipment surface G' and the equipment's neutral line N' and the equipment's live line L'.
3. Preset the value of the current between equipment's neutral line N' and surface G', so that it is less than the safe current for human.

The method and steps of the present invention comprising:
1. Monitoring the current between equipment's neutral line N' and surface G'.
2. Once the current between the N' and G' is detected greater than a preset tripping threshold, immediately trip the alarm indication to alarm or remove the power supply to the equipment.

Best Mode Embodiment 1

Figure 2:
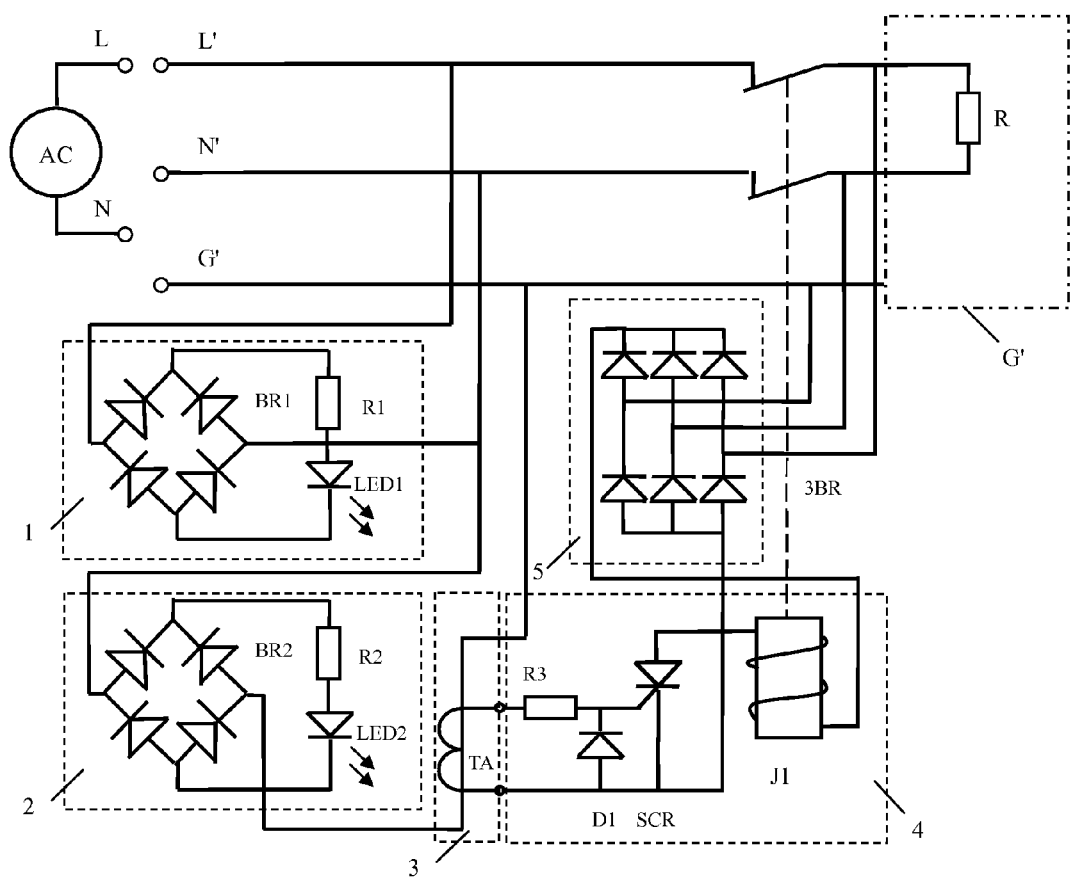
FIG. 2 is the electrical schematic diagram of the best mode embodiment 1 of the present invention. The embodiment uses one amplification and execution circuit unit and one power channel composing three-phase Rectifier Bridge.

FIG. 2 is the electrical schematic diagram of the best mode embodiment 1 of the present invention. AC power supply consists live line L and neutral line N, and is connected to a normally closed stripping switch of J1 through equipment live line L' and equipment neutral line N', and the switch is further connected to equipment. The equipment's surface is floating. The current channel 1 is composed by the rectifier bridge BR1, the resistor R1 and the light emitting diode LED1. There are two AC input terminals of BR1, one terminal is connected to L' while another is connected to N'. R1 and LED1 are connected in series then connected to two DC output terminals of the rectifier bridge BR1, wherein the R1 is current limiting resistor, in this case the resistance value is 36K; the light emitting diode LED1 is an ordinary light emitting diode.

When the power supply's live line L and neutral line N are connected accordingly with equipment's live line L' and neutral line N', the rectifier bridge BR1's output DC current flows through R1 to light up the LED1, indicating the equipment is connected to the AC power supply. The current Channel 2 is composed by the rectifier bridge BR2, the resistor R2 and the light emitting diode LED2. There are two AC input terminals of BR2, one terminal is connected to the equipment's neutral line N', another is connected to equipment surface G' through the primary winding of current transformer TA. R2 and LED2 are connected in series then connected to two DC output terminals of the bridge rectifier BR2, wherein the R2 is adjusted to a value that when the electrical voltage between N' and G' is equal to the AC power supply's voltage, the current between N' and L' is less than the safe current for human, in this case R2 is 33 k and preset current is less than 30 mA. When the power supply's live line L and neutral line N are erroneously connected to the equipment's neutral line N' and surface G', the input terminal of bridge rectifier BR1 loses its AC power supply, the LED1 is not lit, there is no current generated in the current channel 1; the AC input terminal of bridge rectifier BR2 gets AC power supply to light AC power LED2 up, there is a current in current channel 2, which trips the execution and amplification circuit 4 to operate and cut off the power supply. Thus according to LED1 is not lit meanwhile LED2 is lit can tell that L and N is mistakenly connected to N' and G'. When the power live line L and neutral line N are erroneously connected to the equipment's live line L' and surface G', one AC input terminal of the rectifier bridge BR2 is connected to AC power through current channel 1, a current is generated in the current channel 2 through current channel 1, trips the execution and amplification circuit to operate and cut off the power supply. Since in this moment both rectifier bridge BR1 and BR2 get about equal AC power voltage, both the light-emitting diodes LED1 and LED2 are lit, indicating that the power supply's live line L and neutral line N was erroneously connected to the equipment's live line L' and surface G'. When the power supply's live line L is connected to the equipment's neutral line N' and power supply's neutral line N is connected to the equipment's live line L' by mistake, the voltage of L is past to the equipment surface G' through the current channel 2, in this case if a person contacts G', there will be a conducted loop formed by current channel 2, person's body and earth in series connecting L to earth, and a current will be generated and flowing through current channel 2 to trip the present invent system to cut off the power supply quickly (in this case, switch off time <0.1S). In case of the invented system is faulty and unable to cut off the power supply, the current flowing through the current channel 2 is preset to be less than the safe current for human, therefore will not cause the causalities.

The detection circuit 3 contains a current transformer TA, whose primary winding, formed by wiring a conducted wire several turns at TA's magnetic ring, connects the current channel 2 to the equipment surface G' or to the equipment's neutral line N'; whose secondary winding is connected to trigger circuit of the thyristor of the execution and amplification circuit 4. Adjusting the number of turns of the primary winding of the current transformer TA until when the equipment surface G' is energized or the wiring between equipment and the power supply is erroneous, the output voltage of the TA secondary winding will turn the thyristor SCR on, then the corresponding current value of current channel 2 is equal to the preset trigger current threshold.

The amplification and execution circuit 4 contains amplification and execution circuit unites composed by the SCR amplification and control circuit and the relay circuit. Wherein the SCR amplification and control circuit contains a resistor R3, a diode D1 and a thyristor SCR. The resistor R3 is connected to thyristor SCR trigger circuit in series to limit the trigger current; the diode D1 and the trigger terminal of thyristor SCR are connected in parallel to suppress reverse trigger voltage. The relay circuit contains a relay in series with the thyristor SCR J1. In this embodiment, the thyristor SRC and control circuit can be replace by other integrated circuit, for example, M54123 RCD circuit, to achieve the same functionality.

Power Channel 5 contains three-phase rectifier bridge. The three AC input terminals of the rectifier bridge are connected to equipment surface G' and equipment's live line L' and neutral line N'; the positive and negative output terminals of the rectifier bridge are connected correspondingly to the positive and negative power terminals of the amplification and executions circuit 4.

When the equipment surface G' is energized or power supply is wired erroneously, generating a current in current channel 2, a voltage will be established at the secondary of transformer TA of the current detection circuit 3, triggering the thyristor SCR to be turned on, regardless how the power supply's live line L and neutral line N are connected to the equipment's live line L' and neutral line N' and surface G', there is always a current from L, flowing through the rectifier bridge BR3, the relay winding J1, and the thyristor SCR, then returning to power supply neutral line N, J1 operates, the normally closed switch of J1 opens, disconnecting the equipment from the power supply.

Since the current channel 1 and 2 are connected in front of the relay switch J1 which allows the LEDs in the current channel still keeps indicating the warning after the J1 cuts off the power supply: When the light emitting diode LED1 is lit and the LED2 is not lit, indicating that the leakage occurs between the power supply's live line L and equipment surface G', or power supply's line L and neutral line N are connected in reverse and someone contacted G', led to the protective action; when the light emitting diode LED1 is not lit and LED2 is lit, indicating that the power supply's live line L and neutral line N are erroneously connected to the equipment's neutral line N' and surface G', led to the protective action; when both LED1 and LED2 are lit, indicating that the power supply's live line L and neutral N are erroneously connected to the equipment's live line L' and surface G', led to the protective action.

Best Mode Embodiment 2

Figure 3:
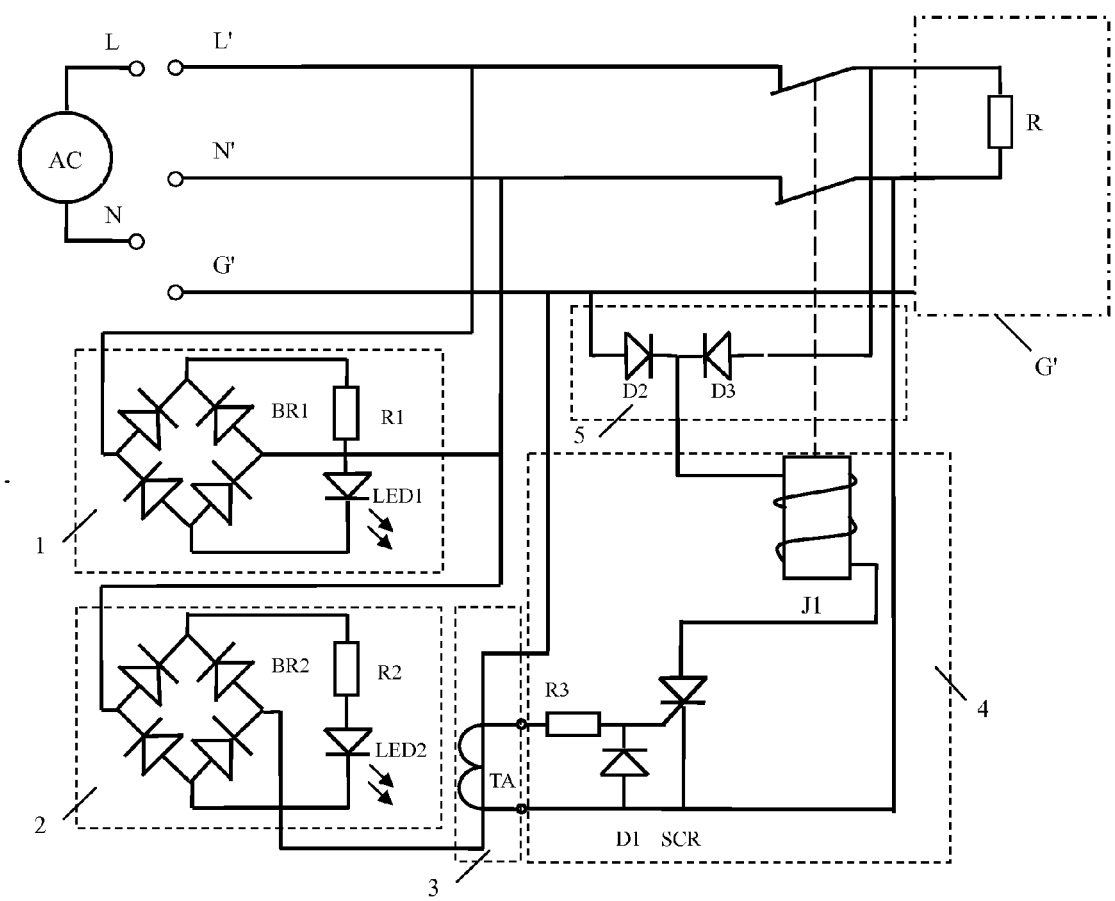
FIG. 3 is the electrical schematic diagram of the best mode embodiment 2 of the present invention. The embodiment uses one amplification and execution circuit unit and one power channel composing dual diode.

FIG. 3 is the electrical schematic diagram of the best mode embodiment 2 of the present invention. In this embodiment, the connection between the power supply and the equipment and the structure and the connection of the current channel 1 and current channel 2 are the same to the embodiment 1. The difference is that the power channel 5 contains a diode D2 and a diode D3. The D2 and D3 are connected with the same polarity (in this embodiment are connected in positive poles) then to the J1's relay winding, another pole of diode D2 is connected to the equipment surface G', another pole of the D3 is connected with equipment's live line L'. When the equipment surface G' is energized or the power supply is wired erroneously, a current is generated in current channel 2, which establishes a voltage at the secondary winding of transformer TA of the current detection circuit 3, triggering the thyristor SCR to be turned on. If the power supply's live line L and neutral line N are connected to the equipment's live line L' and neutral line N', there is a current from the equipment's live line L' flowing through D3, J1's relay winding and thyristor SCR, then reaching equipment's neutral line N', triggering the normally closed switch of J1 open to cut off the power supply. If the power supply's live line L and neutral line N are connected to the equipment surface G' and equipment's neutral line N', there is a current from the equipment surface G' flowing through diode D2, relay winding J1 and thyristor SCR, then reaching equipment's neutral line N', triggering the normally closed switch of J1 open to cut off the power supply. If the power supply's live line L and neutral line N are connected to the equipment's live line L' and surface G', there are two-way currents flowing through the relay J1's coil: one way current is from equipment's live line L' flowing through diode D3, relay j2 winding and thyristor SCR, arriving to the neutral line N', then continually going forward through current channel 2 reaching equipment surface G'; another way current is from the equipment's outer surface G' flowing through diode D2, relay J1 winding and thyristor SCR, arriving to the neural line N', then continually going forward through current channel 1 reaching equipment live line L', triggering the normally closed switch of J1 open to cut off the power supply. Since the relay J1 lost power in a very short period of time (in this case <0.1S) after cut off the power supply, it is able to work in a wide range of instantaneous operating current.

In this embodiment the light emitting diode indication has the same warning to the embodiment 1.

Best Mode Embodiment 3

Figure 4:
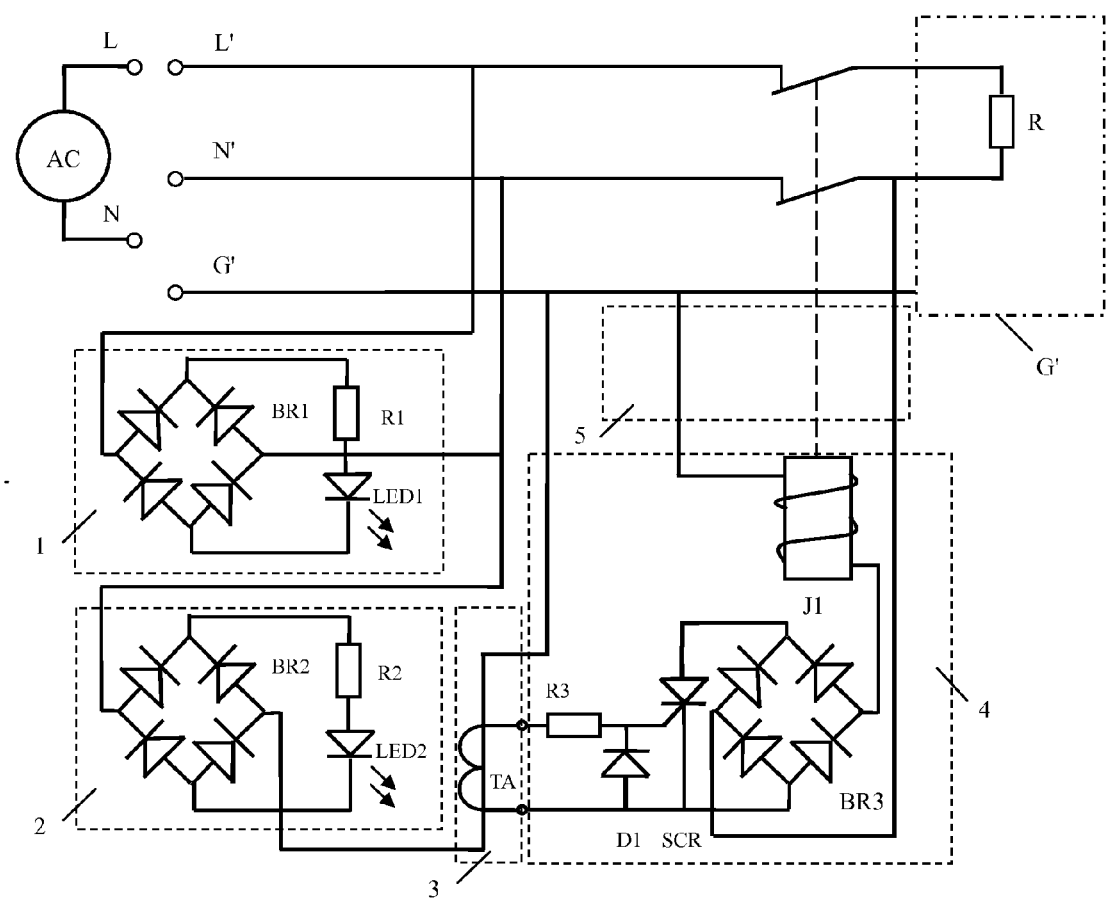
FIG. 4 is the electrical schematic diagram of the best mode embodiment 3 of the present invention. The embodiment uses one amplification and execution circuit unit and one power channel composing dual conduct wire.

FIG. 4 is the electrical schematic diagram of the best mode embodiment 3 of the present invention. In this embodiment, the connection between the power supply and the equipment and the structure and the connection of the current channel 1 and current channel 2 are the same to the embodiment 1. The difference is that the power channel 5 is composed by two wires, one end of the first wire is connected to the equipment surface G', one end of the second wire is connected to the equipment's neutral line N', the other two ends of wires are connected separately to the power supply terminals of amplification and execution unite of circuit 4. Comparing to the embodiment 1 and 2, in this embodiment, when the power supply's live line L and the power supply's neutral line N are connected to the equipment's neutral line N' and the equipment surface G', the amplification and execution circuit 4 gets power directly from the AC power supply; when L and N are connected to L' and G', the circuit 4 gets AC voltage through current channel 1 indirectly. Thus it requires the relay J1 of circuit 4 able to work in a wide current range.

In this embodiment the light emitting diode indication has the same warning to the embodiment 1.

Best Mode Embodiment 4

Figure 5:
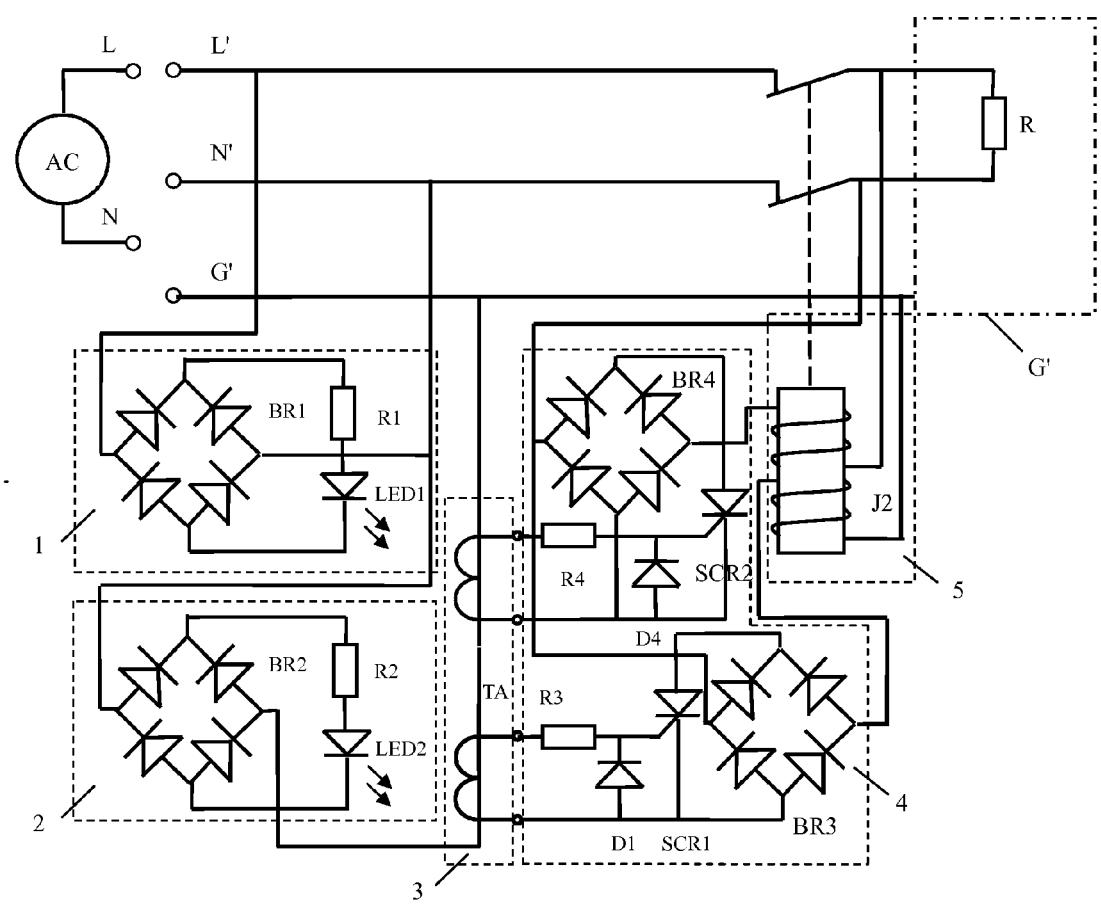
FIG. 5 is the electrical schematic diagram of the best mode embodiment 4 of the present invention. The embodiment uses two amplification and execution circuit units and one power channel composing two wire windings.

FIG. 5 is the electrical schematic diagram of the best mode embodiment 4 of the present invention. In this embodiment, the connection between the power supply and the equipment and the structure and the connection of the current channel 1 and current channel 2 are the same to the first embodiment. The difference is that the detection circuit 3's transformer TA has two secondary outputs which trigger two independent amplification and execution circuit unites as the same as the amplification and execution circuit 4 in best mode embodiment 1. The two coils which are wound on the same relay are used as the power channel 5, one end of first winding is connected to the equipment surface G', another end of first winding is connected to the switch circuit which is composed by the rectifier bridge BR3 and thyristor SCR1; one end of second winding is connected to the equipment's live line L', another end of second winding is connected to the switch circuit which is composed by the rectifier bridge BR4 and thyristor SCR2.

When the equipment surface G' is energized or power supply is wired erroneously, generating a current in current channel 2, the current detection circuit 3 generates the two secondary voltages of the transformer TA which trigger the thyristor SCR1 and SCR2 to be turned on. If the power supply's live line L and neutral line N are connected to the equipment's live line L' and neutral line N', there is a current from L' flowing through the power channel 5's winding of relay J2, rectifier bridge BR4 and thyristor SCR2, then return to equipment's neutral line N', triggering the normally closed switch of J2 open to cut off the power supply. If the power supply is connected to the equipment's neutral line N' and surface G', there is a current from the equipment surface G' flowing through power channel 5's winding of relay J2, rectifier bridge BR3 and thyristor SCR1, then arriving equipment's neutral line N', triggering the normally closed switch of J2 open to cut off the power supply. If the power supply is connected to the equipment's live line L' and surface G', there will be two-way currents flowing through two relay windings of J2: one way current is from equipment's live line L' flowing through power channel 5's winding of relay J2, rectifier bridge BR4 and thyristor SCR2, then reaching equipment's neutral line N', then continually going forward through the current channel 2 and reaching the equipment surface G'; another way current is from the equipment surface G' flowing through power channel 5's another winding of relay J2 and rectifier bridge BR3 and thyristor SCR1, then reaching the equipment's neutral line N', then continually going forward through the current channel 1 and reaching the equipment's live line L'; J1 operates to cut off the power supply.

In this embodiment the light emitting diode indication has the same warning to the embodiment 1.

Best Mode Embodiment 5

Figure 6:
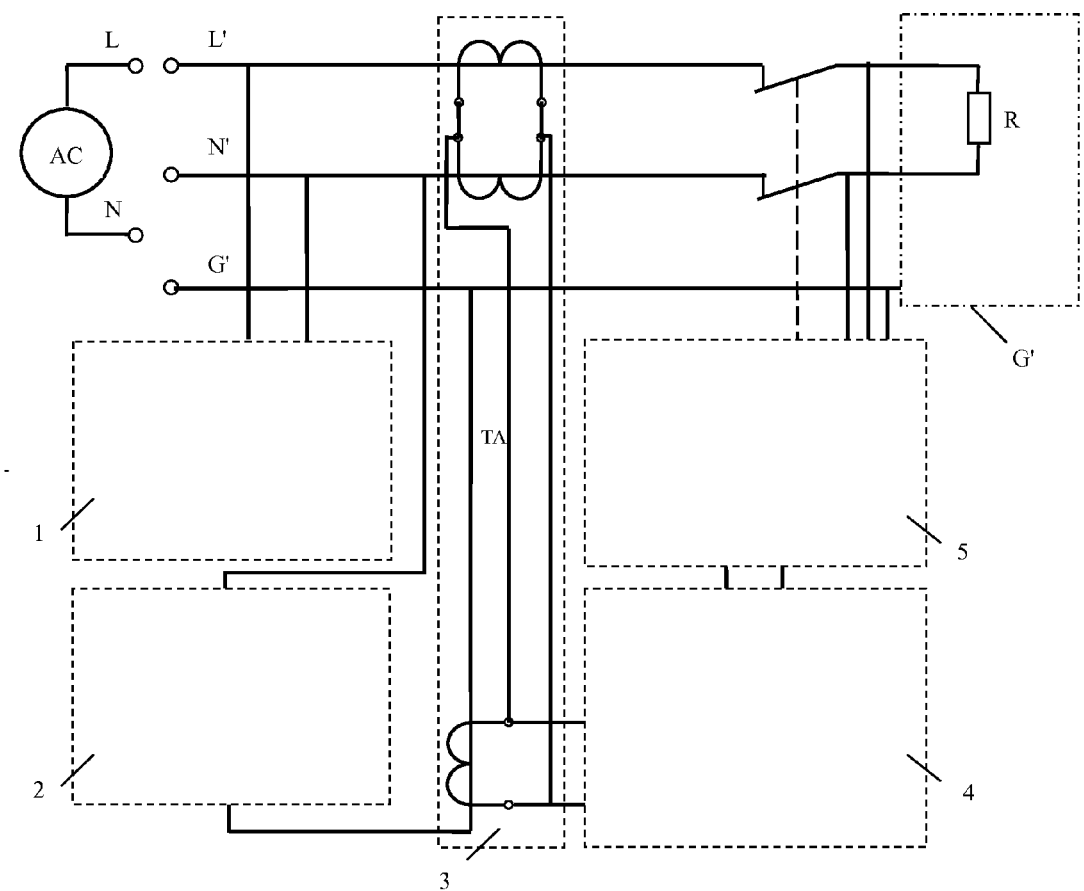
FIG. 6 is the electrical schematic diagram of the best mode embodiment 5 of the present invention. The embodiment monitors current flowing through current channel and current flowing through equipment's live line and current flowing through equipment's neutral line.

FIG. 6 is the electrical schematic diagram of the best mode embodiment 5 of the present invention. Comparing to the other embodiments, the difference in this embodiment is the transformer TA of detection circuit 3, whose secondary winding contains not only the current from the current channel 2, but also the current of equipment's live line L' and the current of neutral line N', thus when there is electrical leakage that causes the TA's inflow live line current is not equal to its outflow neutral line current, a residual current is produced that establishes TA's secondary voltage, tripping the circuit 4 to cut off the power supply. The detection process at current channel 2 and the light emitting diode indication of this embodiment is the same to best mode embodiment 1.

This embodiment can be also applied on equipment's leakage protection of three-phase power supply, just need to replace the power supply's live line L by the three-phase live line.

The invention claimed is:

1. A method of electricity leakage detection and prevention, wherein the method comprises:

Presetting a current channel (1) between equipment's live line and neutral line, a current channel (2) between equipment's neutral line and equipment surface which is connected in series with the current channel (1); the equipment surface is not grounded; when leakage occurs on the equipment surface, a current will flow through the current channel (2); when a power supply's live line and neutral line being erroneously connected to the equipment's live line and the equipment surface, a current will flow through the channel (1) and the channel (2);

Monitoring the current flowing through the current channel (2) caused by leakage and by faulty wiring;

In case of leakage and faulty wiring, the current flowing through the current channel (2) is greater than a preset threshold, tripping an amplification and execution circuit to alarm and/or remove power supply to the equipment.

2. The method of electricity leakage detection and prevention according to claim 1, wherein the current flowing through the preset current channel (2) between the equipment's neutral line and the equipment surface, is preset being less than a current which is safe to pass through a human body, to prevent the possible hazard caused by measurement loop.

3. The method of electricity leakage detection and prevention according to claim 1, wherein the amplification and execution circuit obtains power to work normally even in case of faulty wiring through a power channel which connects the equipment surface, the equipment's live line or the equipment's neutral line directly or indirectly.

4. A system of electricity leakage detection and prevention, comprising a detection circuit (3) and an amplification and execution circuit (4), wherein the system further comprises a current channel (2), which is connecting by conductive electronic components equipment's neutral line (N') with equipment surface (G') which is ungrounded to get a current flowing between (N') and (G') tripping the amplification and execution circuit (4) through the detection circuit (3), to alarm and/or remove power supply to the equipment in case of leakage occurs on the equipment surface; the system further comprises a current channel (1) which is connecting by conductive electronic components equipment's live line (L') with the equipment's neutral line (N'), and is in series with the current channel (2) to get the current tripping the amplification and execution circuit (4) through the detection circuit (3), to alarm and/or remove power supply to the equipment in case of a power supply's live line (L) and neutral line (N) being erroneously connected to the equipment's live line (L') and the equipment surface (G').

5. The system of electricity leakage detection and prevention according to claim 4, wherein said current channel (2) which is connecting the equipment's neutral line (N') with the equipment surface (G'), has the value of conductive electronic components of the current channel (2) being set to ensure the maximum current flowing through the current channel (2) being less than a current which is safe to pass through a human body.

6. A power system connecting the system of electricity leakage detection and prevention described in claim 4, wherein the power system comprises a power channel; input of the power channel is connected to the equipment surface (G'), the equipment's live line (L') and/or the equipment's neutral line (N'), and output of the power channel is connected to the amplification and execution circuit (4), so that in case of a power supply's live line (L) and neutral line (N) being erroneously connected to the equipment's live line (L')

and the equipment surface (G'), the power channel inputs power through (L') and (G') and outputs enough power to drive the amplification and execution circuit (4); in case of the power supply's live line (L) and neutral line (N) being erroneously connected to the equipment's neutral line (N') and the equipment surface (G'), the power channel inputs power through (N') and (G') and outputs enough power to drive the amplification and execution circuit (4).

7. The power system according to claim 6, wherein the power channel comprises a three-phase rectifier bridge, three AC input terminals of the rectifier bridge are correspondingly connected to the equipment's live line (L'), the equipment's neutral line (N'), and the equipment surface (G'); positive terminal and negative terminal of output of the rectifier bridge are correspondingly connected positive terminal and negative terminal of power supply of the amplification and execution circuit (4).

8. The power system according to claim 6, wherein the power channel comprise two diodes, the diodes are connected to each other by the same polarity then further connected to power supply of amplification and execution circuit unit of the amplification and execution circuit (4), one of remaining diode poles is connected to the equipment surface (G'), another remaining pole is connected to the equipment live line (L').

9. The power system according to claim 6, wherein the power channel comprise two conduct wires, the first conduct wire's one end is connected to the equipment surface (G'), the second conduct wire's one end is connected to the equipment's neutral line (N'), two remaining ends of the conduct wires are connected to two terminals of power supply of amplification and execution circuit unit of the amplification and execution circuit (4).

10. The power system according to claim 6, wherein the power channel comprises two wire windings which are wound to the same electronic relay, one end of the first winding is connected to the equipment's live line (L'), while another end is connected to output terminal of one independent amplification and execution circuit unit; one end of the second winding is connected to the equipment surface (G'), while another end is connected to output terminal of another independent amplification and execution circuit unit.

* * * * *